(12) United States Patent
Sekiguchi et al.

(10) Patent No.: US 9,794,543 B2
(45) Date of Patent: Oct. 17, 2017

(54) INFORMATION PROCESSING APPARATUS, IMAGE CAPTURING APPARATUS, CONTROL SYSTEM APPLICABLE TO MOVEABLE APPARATUS, INFORMATION PROCESSING METHOD, AND STORAGE MEDIUM OF PROGRAM OF METHOD

(71) Applicants: Hiroyoshi Sekiguchi, Kanagawa (JP); Soichiro Yokota, Kanagawa (JP); Eita Watanabe, Kanagawa (JP); Reiko Kuromizu, Kanagawa (JP); Yuji Takahashi, Kanagawa (JP)

(72) Inventors: Hiroyoshi Sekiguchi, Kanagawa (JP); Soichiro Yokota, Kanagawa (JP); Eita Watanabe, Kanagawa (JP); Reiko Kuromizu, Kanagawa (JP); Yuji Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/049,971

(22) Filed: Feb. 22, 2016

(65) Prior Publication Data
US 2016/0261848 A1    Sep. 8, 2016

(30) Foreign Application Priority Data

Mar. 2, 2015  (JP) ................................ 2015-040637
Mar. 30, 2015 (JP) ................................ 2015-068559

(51) Int. Cl.
*H04N 13/02*  (2006.01)
*G06K 9/62*   (2006.01)
(Continued)

(52) U.S. Cl.
CPC ........... *H04N 13/0214* (2013.01); *B60R 1/00* (2013.01); *G06K 9/00791* (2013.01); *G06K 9/52* (2013.01);
(Continued)

(58) Field of Classification Search
None
See application file for complete search history.

(56) References Cited

U.S. PATENT DOCUMENTS 5,867,591 A * 2/1999 Onda .................... G01C 11/06
                                                   348/43
7,333,651 B1 * 2/2008 Kim ..................... G06K 9/6202
                                                   345/419
(Continued)

FOREIGN PATENT DOCUMENTS

| JP | 2001-351200 | 12/2001 |
| JP | 2015-158394 | 9/2015 |
| JP | 2015-179302 | 10/2015 |

OTHER PUBLICATIONS

Extended European Search Report dated Jul. 26, 2016 in Patent Application No. 16158192.1.
(Continued)

*Primary Examiner* — Tsung-Yin Tsai
(74) *Attorney, Agent, or Firm* — Oblon, McClelland, Maier & Neustadt. L.L.P.

(57) ABSTRACT

An information processing apparatus for processing stereo images of an object includes a disparity calculator to calculate a disparity of the stereo images. The disparity calculator includes an evaluation value calculator to calculate a correlation evaluation value in a search range set for the stereo images; an extreme value detector to detect an extreme value of the correlation evaluation value; a threshold setting unit to set a threshold range for the detected extreme value; a counting unit to count the number of the extreme value existing within the threshold range; and an updating unit to update the set threshold range to a new threshold range when a new extreme value indicating a higher correlation level of the disparity compared to the set threshold range is detected. The counting unit counts the
(Continued)

number of the extreme value in a threshold range updated most recently in the search range.

10 Claims, 12 Drawing Sheets

(51) Int. Cl.
    *B60R 1/00*     (2006.01)
    *G06K 9/00*     (2006.01)
    *G06K 9/52*     (2006.01)
    *H04N 13/00*     (2006.01)

(52) U.S. Cl.
    CPC ......... *G06K 9/6202* (2013.01); *G06K 9/6215* (2013.01); *G06K 9/6267* (2013.01); *H04N 13/0022* (2013.01); *H04N 2013/0081* (2013.01)

(56) References Cited

U.S. PATENT DOCUMENTS

| | | | |
|---|---|---|---|
| 2006/0029272 A1* | 2/2006 | Ogawa | G06K 9/32 382/154 |
| 2011/0211068 A1 | 9/2011 | Yokota | |
| 2012/0026295 A1* | 2/2012 | Nishimura | G01B 11/26 348/46 |
| 2012/0177285 A1* | 7/2012 | Tsurube | G01C 3/085 382/154 |
| 2013/0010106 A1 | 1/2013 | Yokota | |
| 2013/0194390 A1* | 8/2013 | Hirooka | G01C 3/14 348/47 |
| 2013/0250109 A1 | 9/2013 | Yokota | |
| 2015/0248594 A1 | 9/2015 | Zhong et al. | |
| 2015/0294160 A1* | 10/2015 | Takahashi | G06K 9/00791 382/104 |
| 2015/0358610 A1 | 12/2015 | Takahashi et al. | |

OTHER PUBLICATIONS

Douglas Scott, "Stereo-vision framework for autonomous vehicle guidance and collision avoidance," Optomechatronic Micro/Nano Devices and Components III, vol. 5084, XP008046761, Apr. 24, 2003, pp. 100-108.

"The Octave-Forge Community: Function Reference: findpeaks," XP055289331, Feb. 17, 2015, 3 pages, https://web.archive.org/web/20150217043639/http://octave.sourceforge.net/signal/function/findpeaks.html.

* cited by examiner

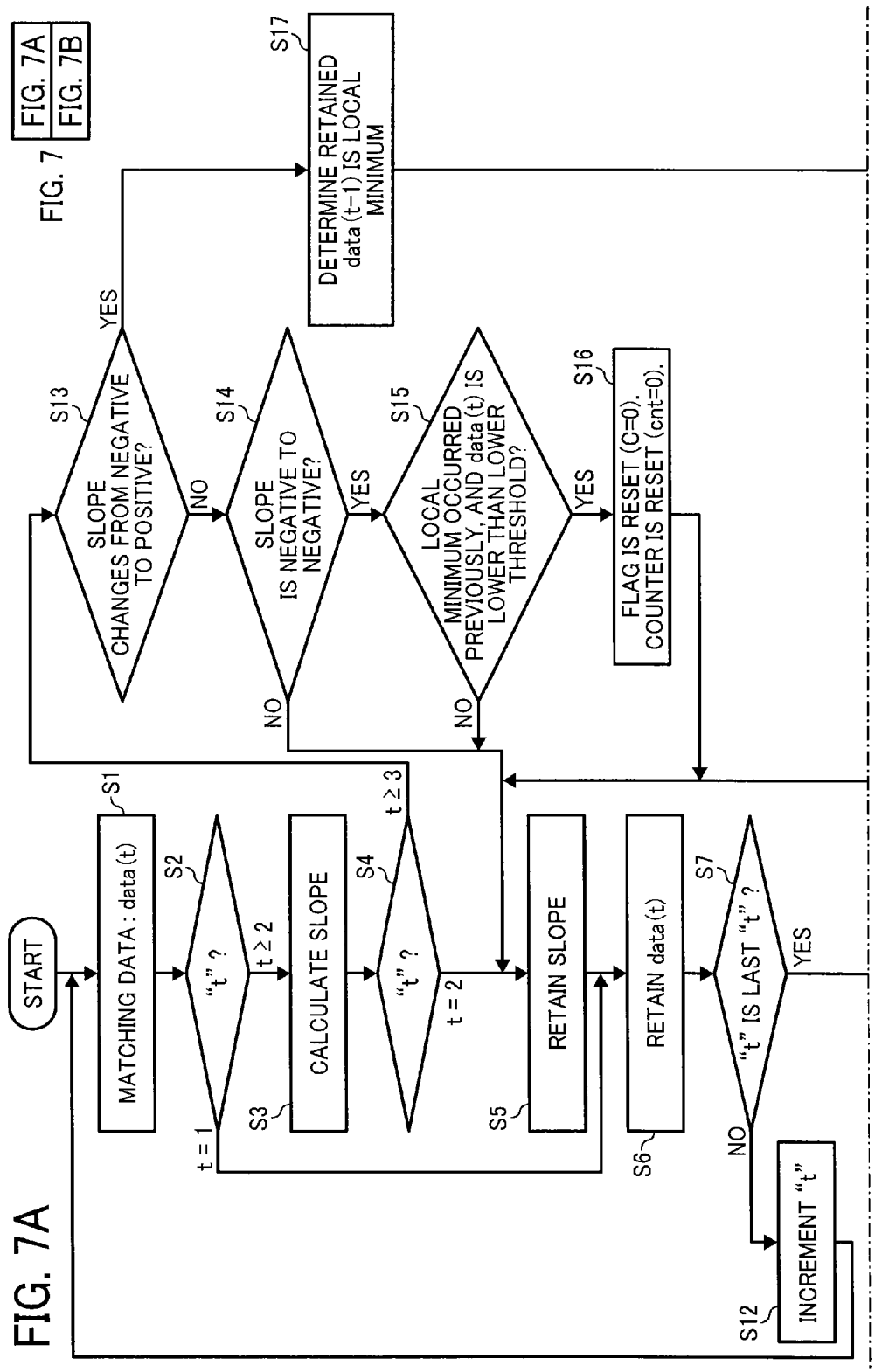

INFORMATION PROCESSING APPARATUS, IMAGE CAPTURING APPARATUS, CONTROL SYSTEM APPLICABLE TO MOVEABLE APPARATUS, INFORMATION PROCESSING METHOD, AND STORAGE MEDIUM OF PROGRAM OF METHOD

CROSS-REFERENCE TO RELATED APPLICATION

This application claims priority pursuant to 35 U.S.C. §119(a) to Japanese Patent Application Nos. 2015-040637, filed on Mar. 2, 2015 and 2015-068559, filed on Mar. 30, 2015 in the Japan Patent Office, the disclosure of which are incorporated by reference herein in its entirety.

BACKGROUND

Technical Field

The present invention relates to an information processing apparatus, an image capturing apparatus, a control system, an information processing method, and a storage of program of method applicable to a moveable apparatus.

Background Art

Driver assistance systems for vehicles include a stereo camera to capture images of objects ahead of the vehicles. For example, the driver assistance system can capture images of objects ahead of the vehicle using the stereo camera disposed at a front side of the vehicle, process the captured images to find a range to the objects such as vehicles, persons, and others. If the vehicle is to be collide other objects, an alarm or warning can be informed to a driver, and a braking system can be activated to decrease the speed of the vehicle or to stop the vehicle.

The range finding by the stereo camera is performed by detecting a difference (i.e., disparity) of image-focused positions of two captured images when the same object is captured from two viewpoints, in which the difference (i.e., disparity) of image-focused positions of the two captured images changes depending on the distance to the object.

The stereo camera capture one image as a reference image, and another image as a comparing image. Then, the disparity of one pixel in the reference image can be calculated by performing a matching process with candidate pixels in a search range set in the comparing image. After completing the matching process to the entire search range, the disparity of the most matched point can be set as the most probable disparity.

The matching process can employ a block matching method, in which a correlation evaluation value (i.e., matching evaluation value) of a small area between the reference image and the comparing image is calculated, and a shift amount (deviation) between the reference image and the comparing image having the most probable correlation evaluation value is calculated as the disparity.

The correlation evaluation value can be Sum of Absolute Difference (SAD), which is a sum of absolute difference of pixel values of two small areas, Sum of Squared Difference (SSD), which is a sum of squared difference, and Zero-mean-Sum of Squared Difference (ZSSD), which is obtained by subtracting an average value of each block from SSD value. Since these evaluation values become smaller as the correlation level becomes higher (i.e., matching level becomes higher), these evaluation values can be used to indicate the dissimilarity level.

FIG. 16 is an example of a profile obtained by performing a matching process. In a case of FIG. 16, the horizontal axis represents a search range, which means the shift amount (deviation) of pixel positions in the comparing image relative to a pixel position in the reference image, and the vertical axis represents the correlation evaluation value indicating the dissimilarity level. In a case of FIG. 16, the dissimilarity level becomes the minimum at the seventh pixel in the search range indicated by a circle, and thereby "seven (7)" becomes the most probable disparity expressed by a whole number. A negative value in the search range on the horizontal axis is used to obtain a sub-pixel disparity.

However, when an image of an object having a repetitive pattern such as building window, tile wall, and fence is captured to calculate the disparity of the object, the matching portion can be detected at two or more portions such as six portions as illustrated in FIG. 17, with which the most probable disparity may not be output correctly but a wrong disparity may be output erroneously.

If the wrong disparity is output erroneously, even if the object having the repetitive pattern actually exists at a far point, data indicating that the object exists at a near point is output erroneously. If the automatic braking system of the vehicle is activated based on the erroneous data, the automatic braking system activates the braking of the vehicle at a point where the braking is not required actually, which is referred to "wrong braking."

In view of this issue, a vehicle-mounted object detection apparatus including a stereo camera is employed, in which stereo images captured by the stereo camera are processed based on a similarity level of each small area in one-side image and another side image of the stereo images. Specifically, when a corresponding position of the two images is computed, it is checked whether a value close to the highest similarity level is detected at a plurality of portions. If the value close to the highest similarity level is detected at the plurality of portions, it is determined that the distance obtained from the small area is a wrong distance caused by the repetitive pattern, and the determined distance is not used for the object detection and measurement. With this configuration, a wrong detection of the object caused by a wrong matching of stereo images caused by the repetitive pattern such as a stripe pattern of crosswalk can be prevented.

However, as to the above described vehicle-mounted object detection apparatus, the determination whether data can be used for detecting the object and measuring the distance to the object is performed after completing the matching process for the entire search range. Therefore, time to obtain the determination result becomes long.

SUMMARY

As one aspect of the present invention, an information processing apparatus for processing stereo images of an object captured from a plurality of viewpoints to recognize the object is devised. The information processing apparatus includes a disparity calculator to calculate a disparity of the stereo images by using a matching process. The disparity calculator includes an evaluation value calculator to calculate a correlation evaluation value in a search range set for the stereo images; an extreme value detector to detect an extreme value of the correlation evaluation value calculated by the evaluation value calculator; a threshold setting unit to set a threshold range for the detected extreme value; a counting unit to count the number of the extreme value existing within the threshold range; and an updating unit to update the set threshold range to a new threshold range when a new extreme value indicating a higher correlation level of the disparity compared to the set threshold range is detected. The counting unit counts the number of the extreme value in a threshold range updated most recently in the search range.

As another aspect of the present invention, an image capturing apparatus is devised. The image capturing apparatus includes an image capturing unit to capture an image of an object from a plurality of viewpoints to acquire stereo images of the object; and an information processing apparatus to process the stereo images to recognize the object. The information processing apparatus includes a disparity calculator to calculate a disparity of the stereo images by using a matching process. The disparity calculator includes an evaluation value calculator to calculate a correlation evaluation value in a search range set for the stereo images; an extreme value detector to detect an extreme value of the correlation evaluation value calculated by the evaluation value calculator; a threshold setting unit to set a threshold range for the detected extreme value; a counting unit to count the number of the extreme value existing within the threshold range; and an updating unit to update the set threshold range to a new threshold range when a new extreme value indicating a higher correlation level of the disparity compared to the set threshold range is detected. The counting unit counts the number of the extreme value in a threshold range most recently updated in the search range.

As another aspect of the present invention, a method of recognizing an object by capturing stereo images of the object from a plurality of viewpoints and calculating a disparity of the stereo images by using a matching process is devised. The method includes calculating a correlation evaluation value in a search range set for the stereo images; detecting an extreme value of the correlation evaluation value calculated by the calculating step; setting a threshold range for the detected extreme value; counting the number of extreme value existing within the set threshold range; updating the set threshold range to a new threshold range when an extreme value having a higher correlation level of the disparity compared to the set threshold range is detected at the detecting step; and counting the number of extreme value in a threshold range updated most recently in the search range.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 7A and 7B is a flow chart showing the steps of a process performable by the disparity calculator shown in FIG. 6;

Figure 1:
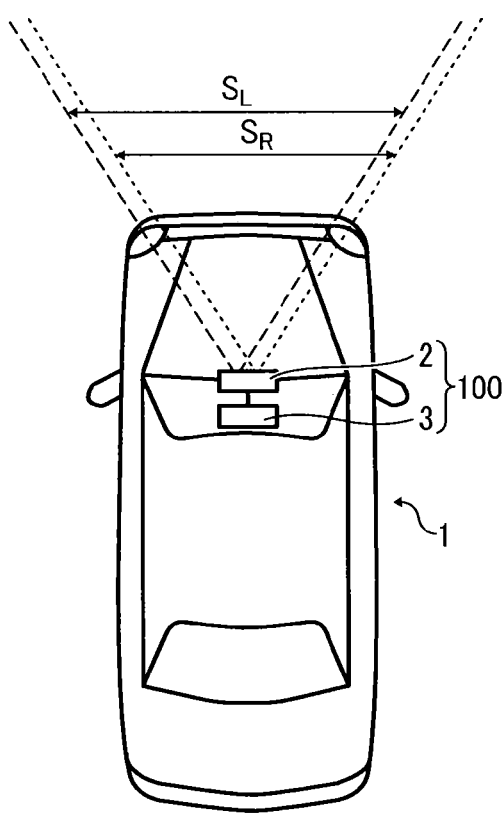
FIG. 1 is a schematic view of an example of an application of a control system applicable to a moveable apparatus of one or more example embodiments of the present invention.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more image processing apparatuses according to one or more example embodiments of the present invention are described hereinafter.

A description is given of an image processing apparatus of one or more example embodiments of the present invention with reference to drawings.

(Configuration of Control System Applicable to Moveable Apparatus)

Figure 2:
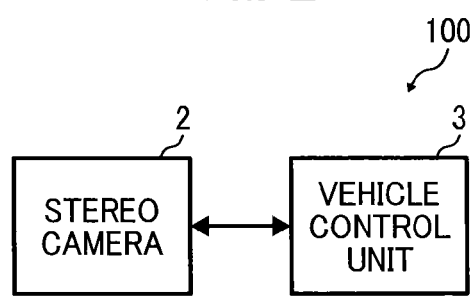
FIG. 2 is a schematic configuration of the control system applicable to the moveable apparatus of FIG. 1.

FIG. 1 is a schematic view of an example of a control system 100 applicable to a moveable apparatus according to one or more example embodiments, and FIG. 2 is a schematic configuration of the control system 100 applicable to the moveable apparatus.

As illustrated in FIGS. 1 and 2, the control system 100 includes, for example, a stereo camera 2 useable as an example of image capturing apparatuses, and a vehicle controller 3 useable as a control unit for a moveable apparatus. The vehicle controller 3 can be configured by circuitry.

As illustrated in FIG. 1, the stereo camera 2 is mountable to the vehicle 1. The vehicle 1 is an example of the moveable apparatus. For example, the stereo camera 2 can be mounted inside a room of the vehicle 1 such as a upper end of a windshield inside the vehicle 1. The stereo camera 2 includes a first image capture device and a second image capture device. The first image capture device captures a left-side image for the left-side sight "SL," and the second image capture device captures a right-side image for the right-side sight "SR" to acquire stereo images. Then, a disparity image is generated by calculating a disparity between the left-side image and the right-side image. Based on the generated disparity image, a range finding is performed to measure a distance from the vehicle 1 to an object ahead of the vehicle 1 to recognize the object, and a recognition result is transmitted to the vehicle controller 3. The movable apparatus can be vehicles such as automobiles, trucks, ships, airplanes, trains, motor cycles, construction machines, robots, or the like. Further, the monitoring system according to one or more example embodiments can be also applied to non-movable apparatuses such as factory robots, monitoring cameras, surveillance cameras or the like that are fixed at one position, area, or the like.

Based on the recognition result transmitted from the stereo camera 2, the vehicle controller 3 performs drive assistance or cruise assistance controls such as reporting a warning to a driver of the vehicle 1, and controlling a steering and braking of the vehicle 1.

(Hardware Configuration of Stereo Camera)

Figure 3:
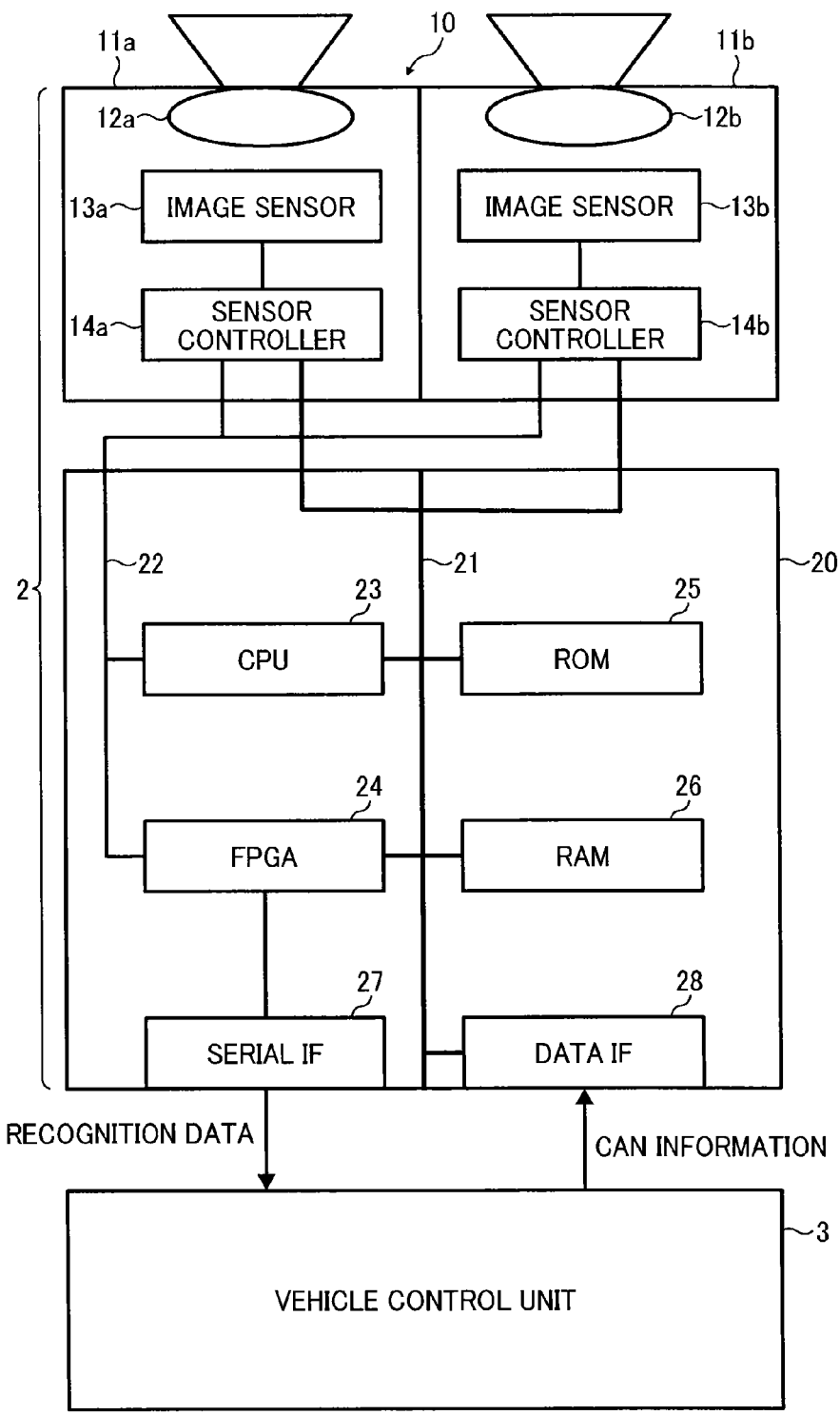
FIG. 3 is a block diagram of a hardware configuration of a stereo camera of one or more example embodiments of the present invention.

FIG. 3 is a block diagram of a hardware configuration of the stereo camera 2. The stereo camera 2 includes, for example, an image capturing unit 10 useable as an image capturing unit, and an information processing unit 20 useable as an information processing unit or an information processing apparatus. The information processing unit 20 can be connected or coupled to the vehicle controller 3.

The image capturing unit 10 includes a plurality of image capture devices disposed side by side along the horizontal direction such as a first image capture device 11a at the left side, and a second image capture device 11b at the right side. The first image capture device 11a includes, for example, a lens 12a, an image sensor 13a, and a sensor controller 14a. The second image capture device 11b includes, for example, a lens 12b, an image sensor 13b, and a sensor controller 14b.

Each of the image sensors 13a and 13b employs, for example, a charge coupled device (CCD) image sensor or complementary metal-oxide semiconductor (CMOS) image sensor. Each of the sensor controllers 14a and 14b performs an exposure control, image reading control, communication with an external circuit, and communication control of image data of the respective image sensors 13a and 13b.

The information processing unit 20 includes, for example, a data bus line 21, a serial bus line 22, a central processing unit (CPU) 23, a field-programmable gate array (FPGA) 24, a read only memory (ROM) 25, a random access memory (RAM) 26, a serial interface (I/F) 27, and a data interface (I/F) 28.

The image capturing unit 10 can be connected or coupled to the information processing unit 20 via the data bus line 21 and the serial bus line 22. The CPU 23 controls the information processing unit 20 as a whole including image processing, and image recognition processing. Further, the CPU 23 controls the sensor controllers 14a and 14b of the image capturing unit 10.

A luminance image captured by each of the image sensors 13a and 13b of the image capturing devices 11a and 11b is written or stored in the RAM 26 of the information processing unit 20 via the data bus line 21. Data for controlling a change of exposure of sensor, data for controlling a change of parameter for reading images, and various setting data outputtable from the CPU 23 or the FPGA 24 can be communicated via the serial bus line 22.

The FPGA 24 performs various real-time processing to the image stored in the RAM 26. For example, the FPGA 24 performs a gamma correction, a distortion correction to set the left-side image and the right-side image in parallel, and a disparity calculation or computing using a matching process such as a block matching method to generate a disparity image, and writes or store the disparity image to the RAM 26.

The ROM 25 stores a computer program such as an object recognition program used for situation or condition recognition, prediction, and object recognition. The object recognition program is one example of image processing programs.

The CPU 23 acquires controller area network (CAN) information such as a vehicle speed, acceleration, a rudder angle, and a yaw rate from the vehicle controller 3 via the data I/F 28 as parameters. Then, the CPU 23 performs various processing such as situation or condition recognition by executing the object recognition program stored in the ROM 25 and using the luminance image and disparity image stored in the RAM 26 to recognize a target object such as an ahead vehicle. Recognition data of the target object can be transmitted to the vehicle controller 3, which controls an automatic braking system and an automatic speed control system, via the serial I/F 27. The automatic braking system controls the braking of the vehicle 1 based on the recognition data of the target object, and the automatic speed control system controls the driving speed of the vehicle 1 based on the recognition data of the target object.

(Principal of Range Finding of Stereo Camera)

Figure 4:
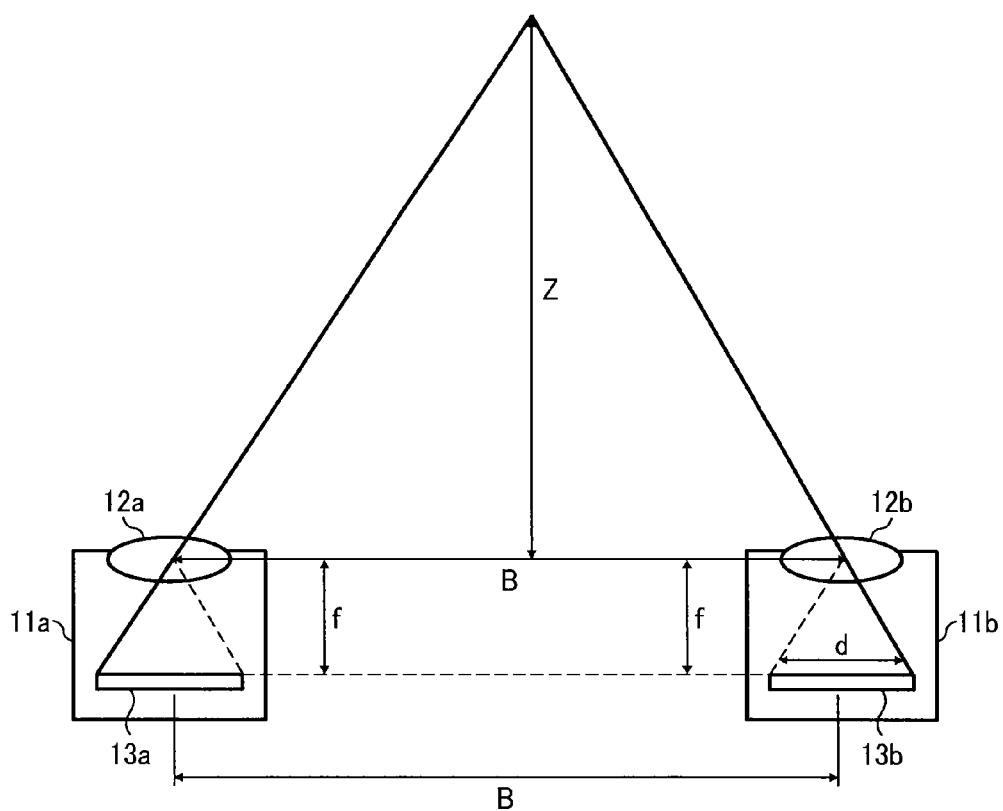
FIG. 4 is a schematic view of the principal of the range finding of the stereo camera.

FIG. 4 is a schematic view of the principal of the range finding of the stereo camera 2. The base line length "B" (i.e., a length between the center of the lens 12a of the first image capture device 11a and the center of the lens 12b of the second image capture device 11b), the focal distance "f" of the lenses 12a and 12b, the disparity "d" (i.e., difference of imaging points of an image of one object between the image sensors 13a and 13b), and the distance "Z" to the object have the relationship expressed by the equation (1).

$$Z=(B\times f)/d \tag{1}$$

The disparity "d" indicates a deviation of pixels in the left-side image captured by the first image capture device 11a and corresponding pixels in the right-side image captured by the second image capture device 11b. The disparity "d" can be calculated by performing the matching process to the reference image and the comparing image. The matching process is performed by detecting a position of a pixel in the reference image and positions of pixels in a search range set in the comparing image, which may match the pixel in the reference image. Typically, the block matching method using a target pixel and pixels surrounding the target pixel can be employed to calculate the disparity "d."

Specifically, a luminance image captured by one of the image capture devices 11a and 11b (e.g., first image capture device 11a) is used as the reference image, and a luminance image captured by another one of the image capture devices 11a and 11b (e.g., second image capture device 11b) is used as the comparing image, and the block matching method is applied to calculate a correlation evaluation value (i.e., matching evaluation value) of the small areas (e.g., 7 pixels×7 pixels) of the reference image and the comparing image, and the shift amount (i.e., deviation) between the reference image and the comparing image corresponding to the highest correlation evaluation value is calculated as the disparity "d." The correlation evaluation value can use known parameters such as SAD, SSD, and ZSSD. As above mentioned, the higher the correlation (i.e., the higher the matching level), the smaller the correlation evaluation value. Therefore, the correlation evaluation value such as SAD, SSD, and ZSSD indicates dissimilarity level of the pixels.

(Functional Configuration of Information Processing Unit)

Figure 5:
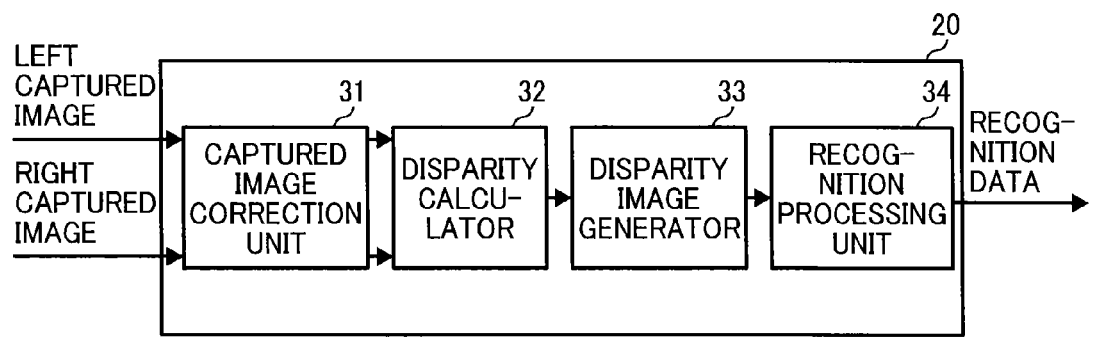
FIG. 5 is a block diagram of a functional configuration of the information processing unit.

FIG. 5 is a block diagram of a functional configuration of the information processing unit 20. As illustrated in FIG. 5, the information processing unit 20 includes, for example, an image correction unit 31, a disparity calculator 32, a disparity image generator 33, and a recognition processing unit 34.

The image correction unit 31 corrects the left-side image and the right-side image by performing a gamma correction, and a distortion correction to set the left-side image and the right-side image in parallel. The disparity calculator 32 calculates the disparity "d" of the left-side images and right-side image corrected by the image correction unit 31. The disparity calculator 32 will be described later in detail. The disparity image generator 33 generates a disparity image from the disparity "d" calculated by the disparity calculator 32. The disparity image is generated by calculating the disparity "d" between pixels in the reference image and the comparing image, and expressing a pixel value corresponding to the calculated disparity "d" as the pixel value of the pixels. The recognition processing unit 34 recognizes an object ahead of the vehicle 1 by using the disparity image generated by the disparity image generator 33, and generates recognition data as a recognition result.

(Functional Configuration of Disparity Calculator)

Figure 6:
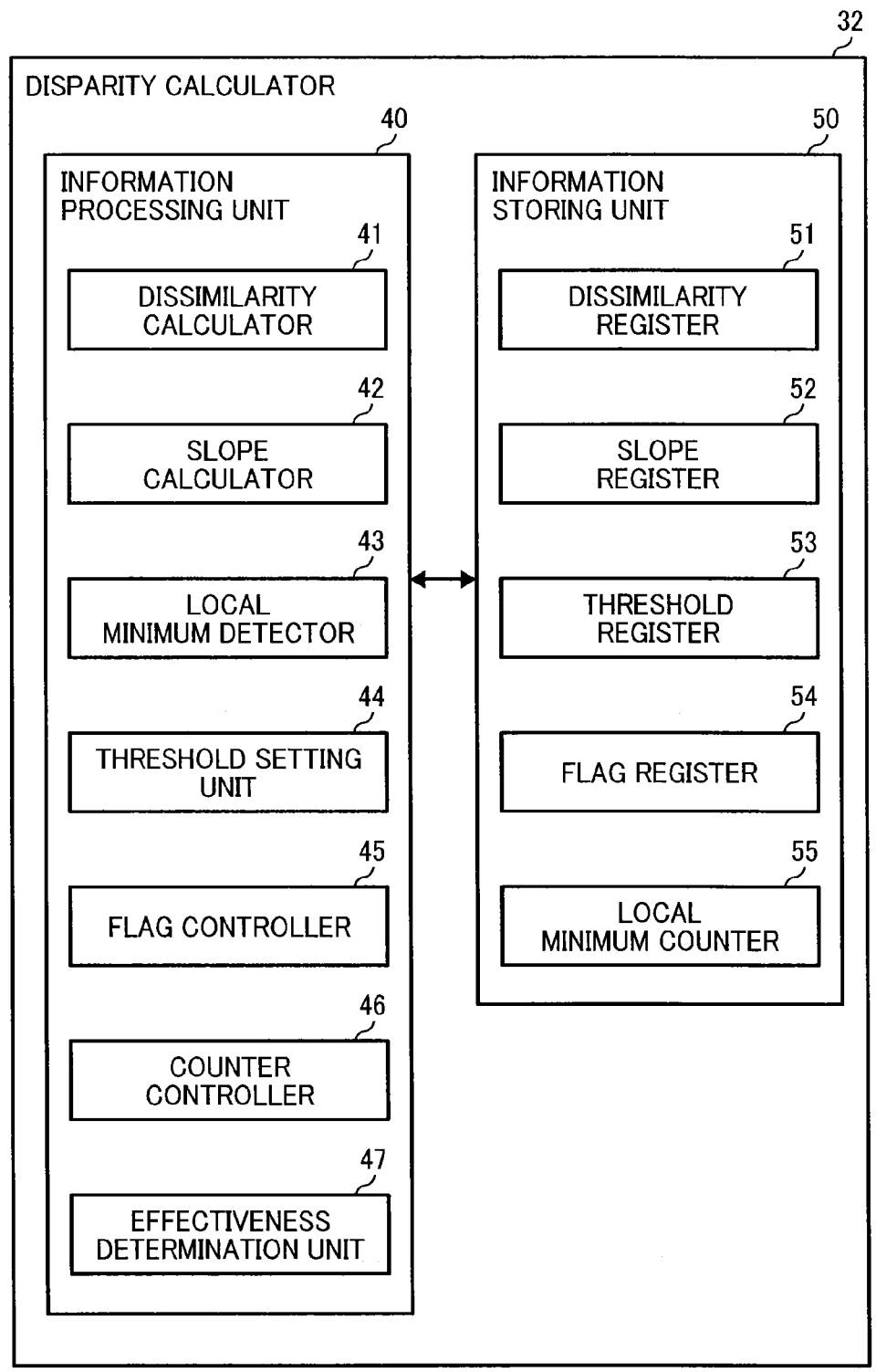
FIG. 6 is a block diagram of a functional configuration of a disparity calculator.

FIG. 6 is a block diagram of a functional configuration of the disparity calculator 32. As illustrated in FIG. 6, the disparity calculator 32 includes, for example, an information processing unit 40, and an information storage 50 communicable with each other.

The information processing unit 40 includes, for example, a dissimilarity calculator 41, a slope calculator 42, a local minimum detector 43, a threshold setting unit 44, a flag controller 45, a counter controller 46, and an effectiveness determination unit 47. Further, the information storage 50 includes, for example, a dissimilarity register 51, a slope register 52, a threshold register 53, a flag register 54, and a local minimum counter 55.

The dissimilarity calculator 41 calculates a correlation evaluation value (i.e., matching evaluation value) between the reference image and the comparing image as an indicator indicating the dissimilarity level using ZSSD, and writes or stores the correlation evaluation value to the dissimilarity register 51. When the dissimilarity level is calculated by shifting positions in the comparing image with respect to the reference image, the dissimilarity level is calculated for each of the shifted positions. Based on differences of the dissimilarity level of the adjacent shift positions, the slope calculator 42 calculates a slope of the dissimilarity level, and writes or stores the slope of the dissimilarity level to the slope register 52. The dissimilarity calculator 41 can be used as an evaluation value calculator.

The local minimum detector 43 detects a local minimum of the dissimilarity level as an extreme value of the correlation evaluation value. Values of the slope calculated by the slope calculator 42 change from a negative value (−) to a positive (+) value at the local minimum of the dissimilarity level. The local minimum detector 43 can be used as an extreme value detector.

When a value retained in the flag register 54 is "0" (i.e., flag is not set), based on the local minimum detected by the local minimum detector 43, the threshold setting unit 44 generates a upper threshold "Uth" and a lower threshold "Lth" for the detected local minimum to set a threshold range (i.e., upper to lower range) to the detected local minimum, and writes or stores the upper threshold "Uth" and the lower threshold "Lth" to the threshold register 53. When the upper threshold "Uth" and the lower threshold "Lth" are set, the flag controller 45 writes the flag of "1" indicating that the upper threshold "Uth" and the lower threshold "Lth" are newly updated to the flag register 54. Further, the counter controller 46 counts up (i.e., increases) the counting number of the local minimum counter 55. The counting number of the local minimum counter 5 indicates the number of points corresponding to the local minimum of the dissimilarity level in the threshold range, set for the detected local minimum retained in the threshold register 53. The counter controller 46 and the local minimum counter 55 can be used as a counting unit When a value retained in the flag register 54 is "1" (i.e., flag is set), and the local minimum detected by the local minimum detector 43 is within the threshold range retained in the threshold register 53, the counter controller 46 counts up (i.e., increases) the counting number of the local minimum counter 55.

Further, when the value retained in the flag register 54 is "1" (i.e., C=1), and the slope calculated by the slope calculator 42 is still being the negative, and the dissimilarity level calculated by the dissimilarity calculator 41 becomes lower than the lower threshold "Lth" retained in the threshold register 53, the counter controller 46 resets the counting number of the local minimum counter 55, in which the flag controller 45 writes or sets the flag of "0" to the flag register 54. The counter controller 46 can be used a reset unit to reset the counting number of the local minimum counter 55.

(Processing by Disparity Calculator)

Figure 7B:
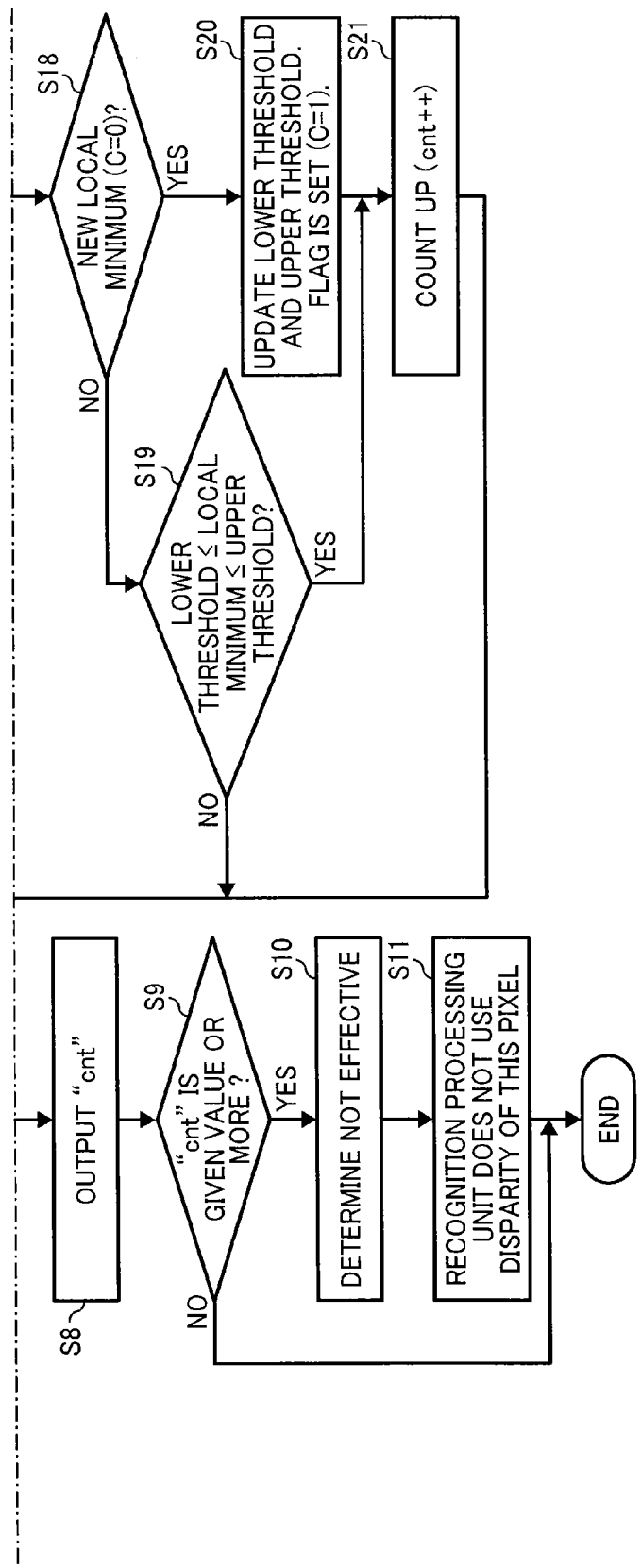
Figure 8:
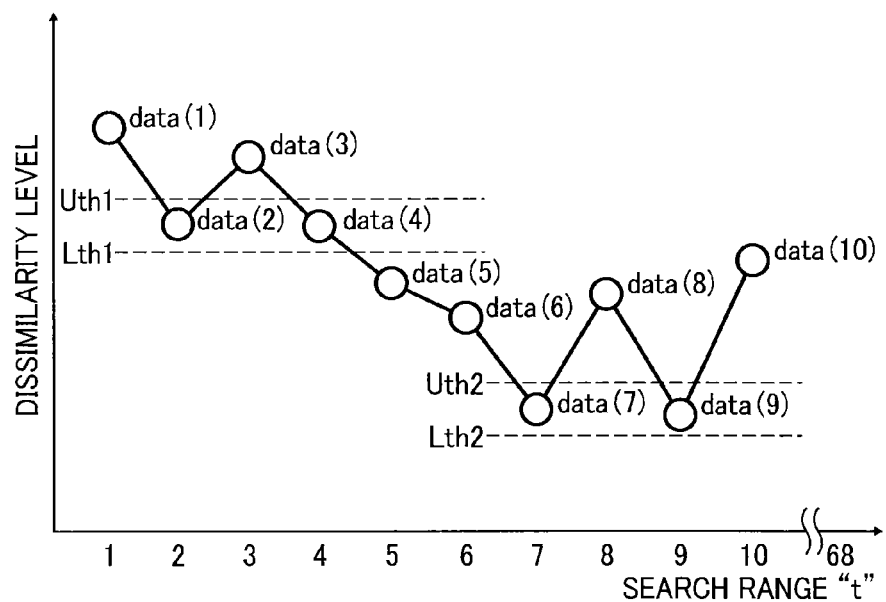
FIG. 8 is an example of a result obtainable by performing the process of FIGS. 7A and 7B by the disparity calculator.

FIGS. 7A and 7B (FIG. 7) is a flow chart showing the steps of a process performable by the disparity calculator 32 shown in FIG. 6. FIG. 8 is an example of a result obtainable by performing the process of FIG. 7 by the disparity calculator 32, in which the horizontal axis represents the search range, which is the shift amount (deviation) of pixel positions of the comparing image relative to a target pixel position in the reference image, and the vertical axis represents the matching evaluation value indicating the dissimilarity level of pixels. A description of given of the process performable by the disparity calculator 32 with reference to FIGS. 7 and 8.

The process of FIG. 7 can be performed for each one of pixels of the reference image by setting a search range in the comparing image. For example, the search range is set from 1 to 68 pixels in the comparing image for each one of pixels of the reference image. When the process of FIG. 7 is to start, data is not written in the dissimilarity register 51, the slope register 52, and the threshold register 53, and further, the flag register 54 is set "0," and an initial value of the local minimum counter 55 is set "0." As to the process of FIG. 7, a value retained in the flag register 54 is referred as the flag of "C=0" or "C=1," and a counting number of the local minimum counter 55 is indicated by "cnt."

When the dissimilarity calculator 41 inputs matching data "data(t)" indicating the dissimilarity level (step S1), a value of "t" is determined (step S2). Since the first value of "t" is one (step S2: t=1), "data(1)" is written and retained in the dissimilarity register 51 (step S6). Then, it is determined whether "t" is the last value, which means it is determined whether "t" is the last "t" in the search range (step S7). Since "t=1" is not the last "t" in the search range (step S7: NO), "t" is incremented to "t=2" (step S12), and then the sequence returns to step S1. In this example case, the last "t" is set "68."

Then, "data(2)" is input for "t=2" (step S1). Then, the sequence proceeds to steps S1→S2→S3, and the slope calculator 42 calculates the slope between "data(1)" and "data(2)" (step S3). The slope can be calculated as a difference of two data such as "data(2)−data(1)." Then, the value of "t" is determined (step S4). Since the value of "t" is two (step S4: t=2), a positive (+) or negative (−) sign of the slope is written and retained in the slope register 52 (step S5).

Then, "data(2)" is written and retained in the dissimilarity register 51 (step S6), and it is determined whether "t" is the last value, which means it is determined whether "t" is the last "t" in the search range (step S7). Based on a determination result that "t" is not the last "t" in the search range (step S7: NO), "t" is incremented to "t=3" (step S12), and then the sequence returns to step S1.

Then, "data(3)" is input for "t=3" (step S1). The sequence of steps S1→S2→S3 of data(3) is same as the steps S1→S2→S3 of "data(2)." However, since the value of "t" is three (t=3), the sequence proceeds to steps S4→S13, and it is determined whether the slope changes from the negative (−) to the positive (+) (step S13), and this determination processing is performed by the local minimum detector 43.

If the slope of "data(2)−data(1)" is a negative (−) value and the slope of "data(3)−data(2)" is a positive (+) value, it is determined that the slope changes from the negative (−) to the positive (+) at "data(2)" (step S13: YES, data "(2)" in FIG. 8), in which it is determined that the retained "data(t−1)" such as "data(2)" is a local minimum (step S17).

If it is determined that "data(2)" is the local minimum at step S17, it is determined whether a newly local minimum is detected, which means it is determined whether the flag is "C=0" (step S18). If it is determined that the flag is "C=0" (step S18: YES), the threshold setting unit 44 updates the upper threshold "Uth" and the lower threshold "Lth" retained in the threshold register 53, and the flag controller 45 sets the flag of "C=1" (step S20). The threshold setting unit 44 can be used as a updating unit that can update the threshold.

The above process is performed for "data(1)" to "data(3)" shown in FIG. 8, in which it is determined that "data(2)" is the local minimum at step S17, and the upper threshold "Uth1" and the lower threshold "Lth1" are updated for the local minimum (i.e., data(2)) at step S20. In this example case, based on "data(1)" to "data(3)," the upper threshold "Uth1" and the lower threshold "Lth1" are set for the first time to "data(t)," in which the upper threshold "Uth" and the lower threshold "Lth" are respectively set as "data(2)+given value" and "data(2)−given value," in which a given value=$2^n$ is set to simplify a circuit configuration.

After step S20, the counter controller 46 counts up (i.e., increases) a counting number of the local minimum counter 55 (step S21). At this stage, the counting number becomes "1." The counting number indicates the number of points corresponding to the local minimum existing within the threshold range (i.e., from the lower threshold "Lth1" to the upper threshold "Uth1") set at step S20.

After step S21, the sequence proceeds to steps S5→66→S7, and the positive (+) or negative (−) sign of the slope (i.e., positive (+) for this case) and the matching data (i.e., "data(3)" for this case) is retained, and it is determined whether "t" is the last value (step S7). Since "t" is not the last value (step S7: NO), "t" is incremented to "t=4" (step S12), and then the sequence returns to step S1.

As to the subsequent "t" such as from "t=4" to "t=68" (i.e., last "t") set in the search range, the sequence proceeds to steps S1→S2→S3→S4→S13, and it is determined whether the slope changes from the negative (−) to the positive (+) to detect a local minimum (step S13). A case that the slope changes from the negative (−) to the positive (+) is described when "t=3" (step S13: YES) as above described. Therefore, a case that the slope does not change from the negative (−) to the positive (+) (step S13: NO) is described hereinafter.

If it is determined that the slope does not change from the negative (−) to the positive (+) (step S13: NO), it is determined whether the slope is still being the negative (−) (step S14). If the slope is not being the negative (−) (step S14: NO), the sequence proceeds to steps S5→S6→S7, in which the sequence of steps S5→S6→S7 and subsequent steps are performed same as the process of "t=3."

In a case of "t=4" shown in FIG. 8, the sequence proceeds steps S13 (NO)→S14 (NO)→S5→S6→S7→S12. As for "t=4," the positive (+) or negative (−) sign of the slope (i.e. negative for this case) and "data(4)" are retained, and "t" is incremented to "t=5" (step S12), and then the sequence returns to step S1.

Then, the sequence proceeds to steps S1→S2→S3→S4→S13 for "t=5", and it is determined whether the slope changes from the negative (−) to the positive (+) at "t=5" (step S13). A case that step S13 is "YES" and a case of steps "S13 (NO)→S14 (NO)" are respectively described for "t=3" and "t=4." Therefore, a case of steps "S13 (NO)→S14 (YES)" is described hereinafter.

In a case of steps "S13 (NO)→S14 (YES)," at step S15, it is determined whether the local minimum is detected previously and "data(t)" (i.e., "data(5)" for this case) becomes lower than the previously-set lower threshold "Lth1" (step S15). If step S15 is "NO," which means that the local minimum was not detected previously, or "data(t)"" is not lower than the lower threshold "Lth1" even if the local minimum is detected previously, the sequence proceeds to step S5.

By contrast, if step S15 is "YES," which means that the local minimum is detected previously and "data(t)" becomes lower than the lower threshold "Lth1," the sequence proceeds to step S16. At step S16, the flag controller 45 sets the flag of "C=0," and the counter controller 46 resets the local minimum counter 55 to "0."

In a case of "data(5)" shown in FIG. 8, the slope is still being the negative for "data(5)"" at "t=5," and the sequence proceeds to steps S13 (NO)→S14 (YES)→S15 (YES)

→S16, and further proceeds to steps S5→S6→S7→S12, in which the positive (+) or negative (−) sign of the slope (i.e., negative (−) for this case) and the matching data (i.e., "data(5)" for this case) are retained, and it is determined whether "t" is the last value (step S7). Since "t" is not the last value (step S7: NO), "t" is incremented to "t=6" (step S12), and the sequence returns to step S1.

Then, the sequence proceeds to steps S1→S2→S3→S4→S13 for "t=6", and it is determined whether the slope changes from the negative (−) to the positive (+) at "t=6" (step S13). In a case of "data(6)" shown in FIG. 8, the slope is still being the negative (−) for "t=6" same as "t=5," and thereby the sequence after step S13 for "t=6" is same as the sequence for "t=5."

Then, the sequence proceeds for "t=7." Since the slope at "t=7" is still being the negative (−) same as "t=5" and "t=6," the sequence after step S13 for "t=7" is same as "t=5." Then, the sequence proceeds for "t=8." When "t=8," since the slope changes from the negative (−) to the positive (+) same as "t=3," the sequence proceeds to steps S17→S18. Since "C=0" is set for "t=5," it is determined that a new local minimum (i.e., "data(7)") is detected (step S18: YES), and then the sequence proceeds to steps S20→S21→S5.

When the new local minimum (i.e., "data(7)") is detected (step S18: YES), at step S20, the upper threshold "Uth1 and the lower threshold "Lth1" are respectively updated to the upper threshold "Uth2" and the lower threshold "Lth2" as shown in FIG. 8. The upper threshold "Uth2" and the lower threshold "Lth2" are respectively set as "data(7)+given value" and "data(7)−given value." Further, the counting number of "1" counted up at step S21 indicates the number of points corresponding to the local minimum existing within the new threshold range (i.e., from the lower threshold "Lth2" to the upper threshold "Uth2") updated at step S20.

In a case of FIG. 8, since the slope changes from the positive (+) to the negative (−) when data(9) at "t=9" is detected S13 (NO), the sequence proceeds to steps S13 (NO)→S14 (NO)→S5. Further, since the slope changes from the negative (−) to the positive (+) at when data(10) at "t=10" is detected S13 (YES), the sequence proceeds to steps S13 (YES) S17→S18. Since "C=1" is set at "t=8," it is determined "NO" at step S18 for "t=10," and the sequence proceeds to step S19.

At step S19, it is determined whether "data(9)," which is determined as the local minimum at step S17, is within the threshold range defined by the lower threshold "Lth2" to the upper threshold "Uth2." If "data(9)," which is the local minimum, is within the threshold range (step S19: YES), after counting up (i.e., increasing) the number of the local minimum counter 55 (step S21), the sequence proceeds to step S5. By contrast, if "data(9)," which is determined as the local minimum, is not within the threshold range (step S19: NO), the sequence proceeds to step S5.

In a case of FIG. 8, since "data(9)" is within the threshold range defined by the lower threshold "Lth2" and the upper threshold "Uth2," "data(9)" is counted up (i.e., increased), and the number of the local minimum counter 55 becomes "2." This counting number of "2" means that two points of the local minimum exist within the latest or most recently set threshold range (e.g., threshold range defined by the lower threshold "Lth2" and the upper threshold "Uth2).

Then, the sequence of steps S1→S2→S3→S4→S13 is repeated until "t" becomes the last "t" (e.g., t=68) set in the search range. When "t" becomes the last "t" such as "t=68" (step S7: YES), the counter controller 46 outputs the counting number of the local minimum counter 55 (step S8).

Then, the effectiveness determination unit 47 determines whether the counting number becomes a given value (e.g., two) or more (step S9). If the counting number becomes the given value or more (step S9: YES), the effectiveness determination unit 47 determines that the counting number is null or not effective (step S10), and the effectiveness determination unit 47 sets a flag so that the recognition processing unit 34 does not use the disparity of pixels of the concerned reference image (step S11).

As to conventional system or apparatus, the number of pixel points having the dissimilarity closer to the target dissimilarity level and the most probable disparity of pixels are detected after completing the calculation of the dissimilarity level for the entire of the search range. By contrast, as to the disparity calculator 32 of one or more example embodiments of the present invention does not detect the dissimilarity closer to the target dissimilarity level or the most probable disparity of pixels after completing the calculation of the dissimilarity level for the entire of the search range. Specifically, as to the disparity calculator 32 of one or more example embodiments of the present invention, the counting of the number of points corresponding to the local minimum of the dissimilarity level is performed concurrently while the disparity is being searched, in which when the local minimum of the dissimilarity level deviates from a given range, the given range is updated to a new range, and the number of points corresponding to the local minimum of the dissimilarity level is counted in the updated new range. With this configuration, it can determine whether the disparity obtained for the stereo image having a repetitive pattern can be used for an object recognition processing with a shorter time even if the repetitive pattern is detected without a longer processing time set for conventional system or apparatus. Therefore, as to the control system 100 applicable to the moveable apparatus having the disparity calculator 32 of one or more example embodiments of the present invention, the above mentioned "wrong braking" can be reduced.

As to the process of FIG. 7, "t" is sequentially searched from a smaller value to a greater value, but "t" can be sequentially searched from a greater value to a smaller value. Further, as to the process of FIG. 7, when a local minimum is detected for the first time, the upper threshold "Uth" and the lower threshold "Lth" are set for the local minimum, but the upper threshold "Uth" and the lower threshold "Lth" can be set as initial threshold settings when the process of FIG. 7 starts. Further, as to the process of FIG. 7, the correlation evaluation value uses the dissimilarity level that the value becomes smaller as the correlation becomes higher, but the correlation evaluation value can use the similarity level that the value becomes greater as the correlation becomes higher.

(Upper Threshold "Uth" and Lower Threshold "Lth")

As to the above described configuration of FIGS. 7 and 8, the upper threshold "Uth1" and the lower threshold "Lth1" are respectively set as "data(2)+given value" and "data(2)−given value," and the upper threshold "Uth2" and the lower threshold "Lth2" are respectively set as "data(7)+given value" and "data(7)−given value." Therefore, the upper threshold "Uth" and the lower threshold "Lth" are respectively calculated and set by using calculation formulas of "newly detected local minimum+given value" and "newly detected local minimum−given value." Hereinafter, the upper threshold "Uth" and the lower threshold "Lth" calculated by these calculation formula are respectively referred to the first upper threshold "Uth" and the lower threshold "Lth."

A description is given of a case when the null determination (step S10) of FIG. 7 is correct, and a case when the null determination (step S10) of FIG. 7 is not correct, and the upper threshold "Uth" and the lower threshold "Lth" that can reduce occurrence of erroneous null determination can be set as a second upper threshold "Uth" and a second lower threshold "Lth" as described below.

(When Null Determination is Detected Correctly)

Figure 9:
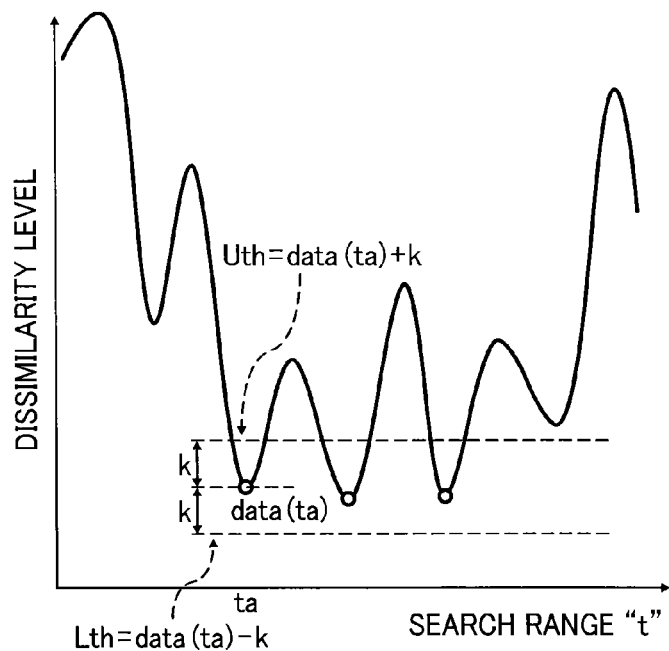
FIG. 9 is an example of a profile of dissimilarity level when a null determination is correct.

FIG. 9 is an example of a profile of dissimilarity level when the null determination of FIG. 7 is detected correctly. As to FIGS. 9 to 15, the horizontal axis represents the search range, and the vertical axis represents the matching evaluation value indicating the dissimilarity level same as FIG. 8.

FIG. 9 is an example of a result of a matching process when an image within the search range is an image composed of a repetitive pattern having a greater number of textures. Since the greater number of textures exist, amplitude of the dissimilarity level (e.g., ZSSD) becomes greater. In an example case of FIG. 9, the threshold Uth (first upper threshold "Uth") and the threshold Lth (lower threshold "Lth") are respectively set to data(ta), which is the local minimum, as "data(ta)+k (given value)" and "data(ta)-k (given value)," and three points corresponding to the local minimum are counted within the threshold range. Based on the correct counting number, the null determination can be obtained correctly (When Null Determination is not Detected Correctly)

Figure 10:
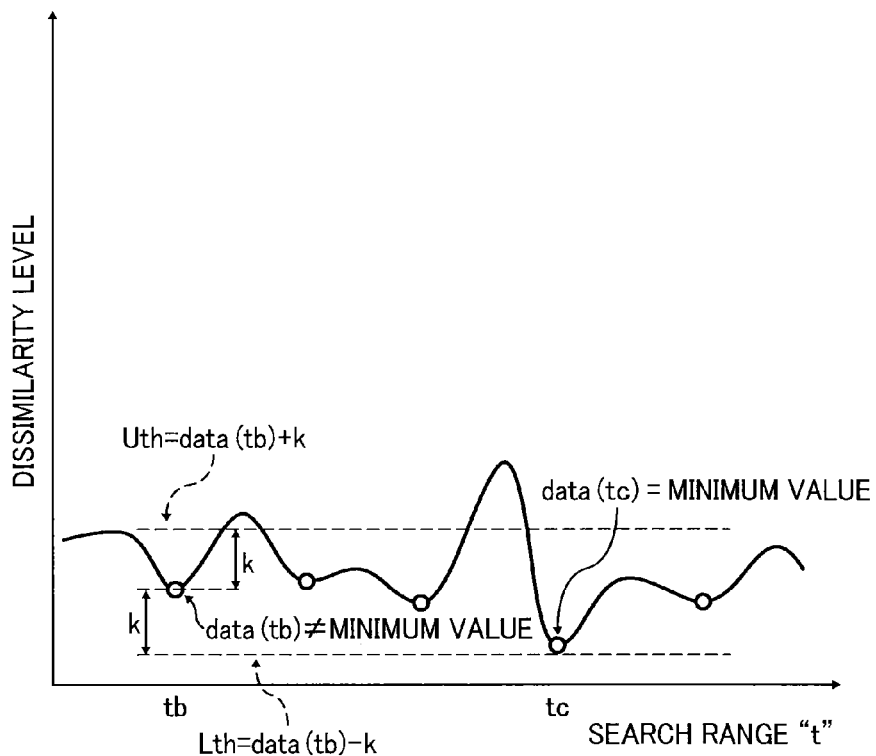
FIG. 10 is an example of a profile of dissimilarity level when s null determination is not correct.

FIG. 10 is an example of a profile of the dissimilarity level when the null determination of FIG. 7 is not detected correctly.

FIG. 10 is an example of a result of a matching process when an image within the search range is an image not composed of a repetitive pattern having a greater number of textures, but an image having composed of lesser textures. Since the number of textures is small, the amplitude of the dissimilarity level becomes smaller. In a case of FIG. 10, the minimum value="data(tc)" exists only at one point, and a correct disparity "tc" can be obtained. However, since the local minimum is counted at five points in the threshold range defined by the threshold Uth (first upper threshold "Uth") and the threshold Lth (first lower threshold "Lth") set for "data(tb)" that is a local minimum but not the minimum value, it is erroneously determined that the disparity calculation is null based on this counting number.

(Second Upper Threshold "Uth" and Second Lower Threshold "Lth")

Figure 11:
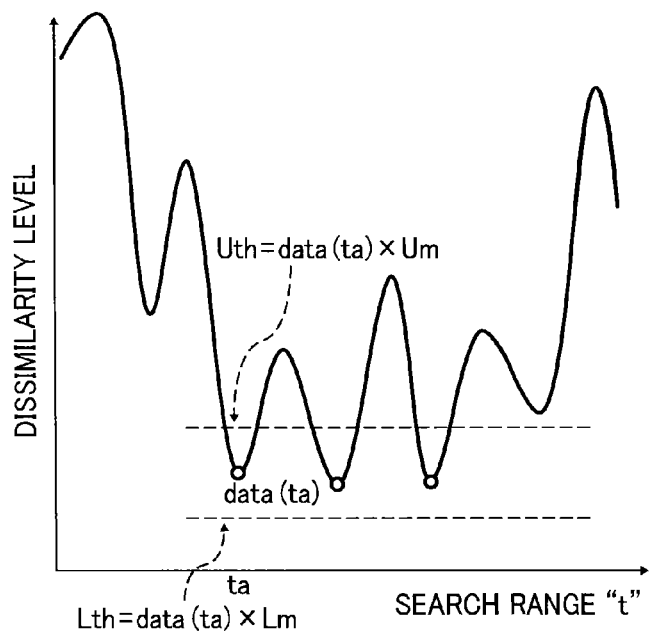
FIG. 11 is one example of a profile for describing a second threshold that can reduce probability that null is determined incorrectly in the process of FIGS. 7A and 7B.
Figure 12:
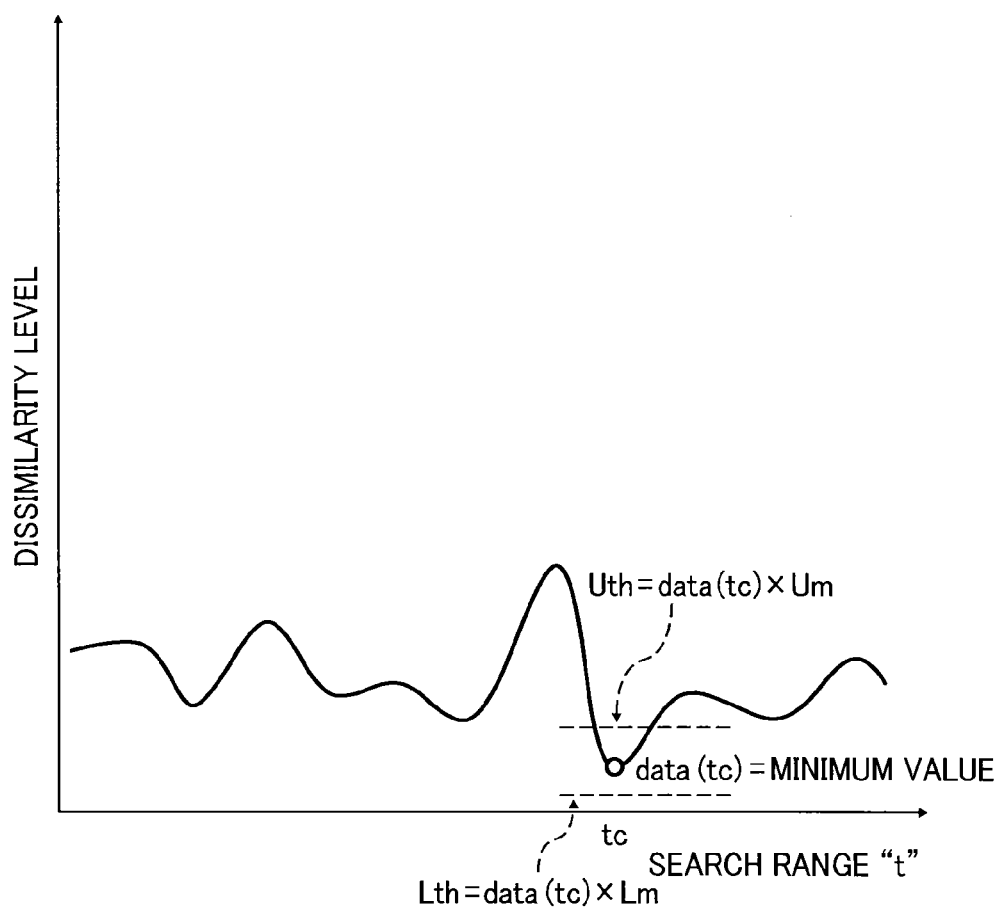
FIG. 12 is another example of a profile for describing a second threshold that can reduce probability that null is determined incorrectly in the process of FIGS. 7A and 7B.

FIG. 11 and FIG. 12 are examples of profiles for describing a second threshold that can reduce probability of occurrence of erroneous null determination in the process of FIG. 7. FIG. 11 shows a profile of the matching process result of the image in the search range that is the same as FIG. 9, and FIG. 12 shows a profile of the matching process result of the image in the search range that is the same as FIG. 10.

The second upper threshold "Uth" and the second lower threshold "Lth" are set based on a newly detected local minimum. For example, in a case of FIG. 11, the threshold Uth (second upper threshold "Uth") and the threshold Lth (second lower threshold "Lth") are respectively set as "data(ta)×Um" and "data(ta)×Lm" with respect to the local minimum of "data(ta)," in which "Um" and "Lm" are coefficient of ratio. The values of the thresholds "Um" and "Lm" can be set any values as long as the relationship of any one of "Um>1>Lm," "Um≥1>Lm," and "Um>1≥Lm" can be maintained. In a case of FIG. 11, the local minimum is counted at three points in the threshold range same as FIG. 9.

Further, in a case of FIG. 12, the threshold Uth (second upper threshold "Uth") and the threshold Lth (second lower threshold "Lth") are respectively set as "data(tc)×Um" and "data(tc)×Lm" with respect to the local minimum of "data (tc)" that is the smallest local minimum. Different from the case of FIG. 10, since the counting number of the local minimum becomes one (1) in the case of FIG. 12, the correct disparity "tc" can be used to set the threshold range.

As above described, by setting the upper threshold "Uth" and the lower threshold "Lth" based on the newly detected local minimum, probability to count only the smallest local minimum, which exists at only one point, can be increased when an image in the search range does not have a repetitive pattern but the image in the search range has little texture. Therefore, by respectively changing the first upper threshold "Uth" and the first lower threshold "Lth" set for the algorithm used for detecting the repetitive pattern to the second upper threshold "Uth" and the second lower threshold "Lth," the probability of occurrence of erroneous null determination can be reduced. If the first upper threshold "Uth" and the lower threshold "Lth" are not changed to the second upper threshold "Uth" and the second lower threshold "Lth," the occurrence of erroneous null determination may more likely occur even if the correct disparity is obtained.

In the cases of FIGS. 11 and 12, the upper threshold "Uth" and the lower threshold "Lth" corresponding to a specific local minimum can be calculated by multiplying the coefficient to the specific local minimum. In the cases of FIGS. 9 and 10, the upper threshold "Uth" and the lower threshold "Lth" are set by using one specific given value "k" but not limited hereto. For example, the upper threshold "Uth" and the lower threshold "Lth" can be set by changing the given value "k" depending on the property of local minimum.

(Minimum Value Processing and Exceptional Processing)

Figure 13A:
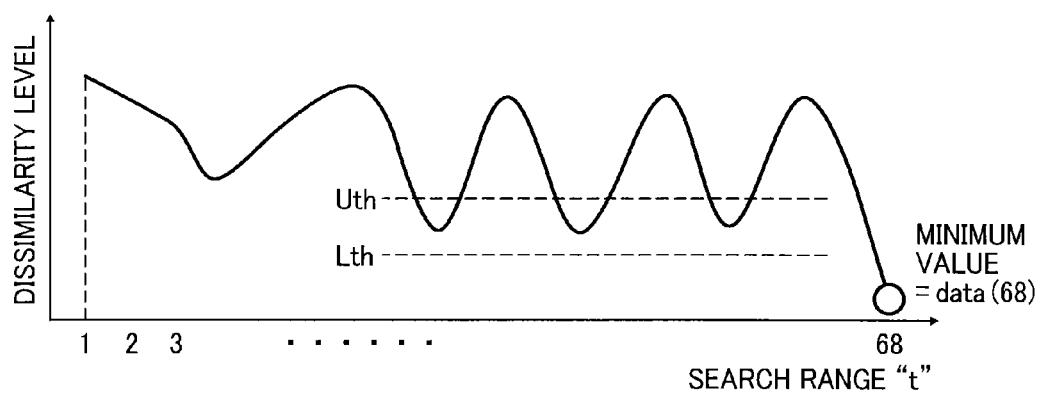
FIGS. 13A and 13B are examples of profiles when the disparity calculator performs a minimum value processing and an exceptional processing.
Figure 13B:
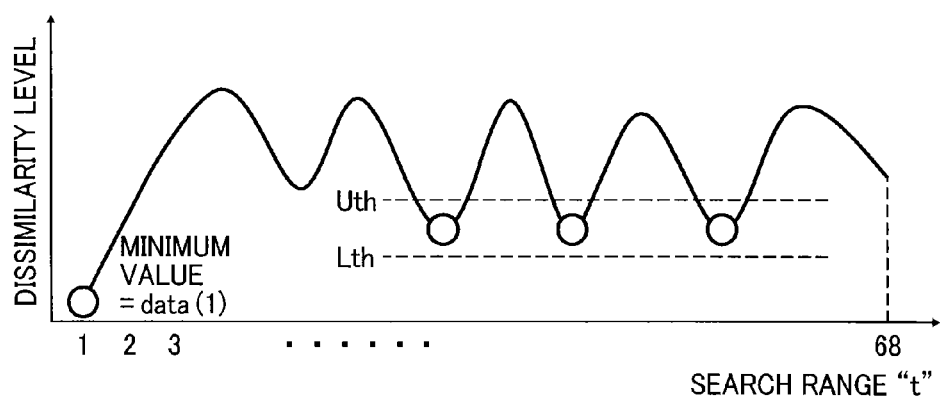

FIGS. 13A and 13B are examples of profiles when the disparity calculator 32 performs a minimum value processing and an exceptional processing.

In the above described configuration, when the disparity is calculated, it is assumed that a disparity that can set the dissimilarity level (e.g., ZSSD) at the minimum value is calculated. Therefore, in addition to the algorithm that counts the number of points corresponding to the local minimum existing within the threshold range set for the lowest dissimilarity level in the process of FIG. 7, it is required to detect the true minimum value of the dissimilarity level, and the disparity corresponding to the true minimum value of the dissimilarity level by performing the process sequentially.

When the minimum value of the dissimilarity level is detected at the last "t" in the search range as illustrated in FIG. 13A, and when the minimum value of the dissimilarity level is detected at the first "t" in the search range as illustrated in FIG. 13B, the true minimum value of dissimilarity level is also processed sequentially. If the true minimum value of dissimilarity level is smaller than the finally (or most recently) updated lower threshold "Lth," the disparity corresponding to the true minimum value of dissimilarity level is output, in which the disparity calculator 32 can be used as an outputting unit to output the disparity. In this case, after the algorithm of FIG. 7 is completed for data of the dissimilarity level at 68 points, the null is compulsory determined as the exceptional processing.

For example, in a case of FIG. 13A, when the algorithm of FIG. 7 is completed for data of the dissimilarity level at 68 points, based on "data(68)," which is the true minimum value of dissimilarity level, the local minimum counter 55 is reset to "0" at step S16, but the null is compulsory determined. Further, if a sub-pixel disparity is to be calculated, the search range "t" set on the horizontal axis of FIG. 13A becomes "−2 to 65," and the right end data (65) becomes the true minimum value of dissimilarity level.

Further, in a case of FIG. 13B, when the algorithm of FIG. 7 is completed for the data of the dissimilarity level at 68 points, the counting number of the local minimum counter 55 becomes "3." Since "data(1)" that is smaller than the lower threshold "Lth" is detected, the null is compulsory determined. Further, if a sub-pixel disparity is to be calculated, the search range "t" set on the horizontal axis of FIG. 13B becomes "−2 to 65," and the left end data(−2) becomes the true minimum value of dissimilarity level.

The true minimum value processing and exceptional processing can be described as below (i) to (iii); (i) when the dissimilarity level at one end of the search range is detected as the minimum value, and the disparity (i.e., value of disparity at "t" in the search range) corresponding to the detected minimum value is a negative value, the null is compulsory determined for any counting number of the local minimum counter 55, (ii) when the dissimilarity level at one end of the search range is within the finally (or most recently) determined threshold range, the local minimum counter 55 counts up (i.e., increases) the counting number. For example, when only the dissimilarity level at the left end of the search range is within the finally (or most recently) determined threshold range, the output counting number is increased for one (1). For example, when only the dissimilarity level at the right end of the search range is within the finally (or most recently) determined threshold range, the output counting number is increased for one (1). For example, when both of the dissimilarity level at the left end and the dissimilarity level at the right end of the search range are within the finally (or most recently) determined threshold range, the output counting number is increased for two (2), and (iii) in a case of monotonous increase or monotonous decrease, the local minimum is not detected, and the counting number becomes "0," and the null is compulsory determined.

(Computing Result of Disparity Calculator)

Figure 14:
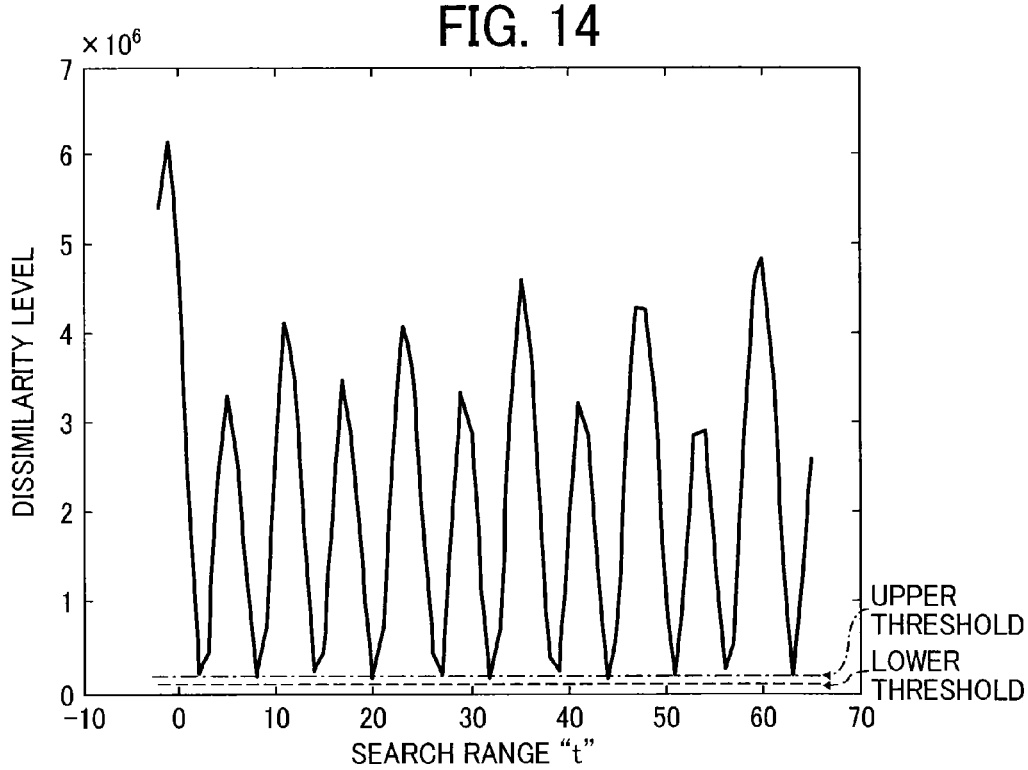
FIG. 14 is a first example of computing result of the disparity calculator.
Figure 15:
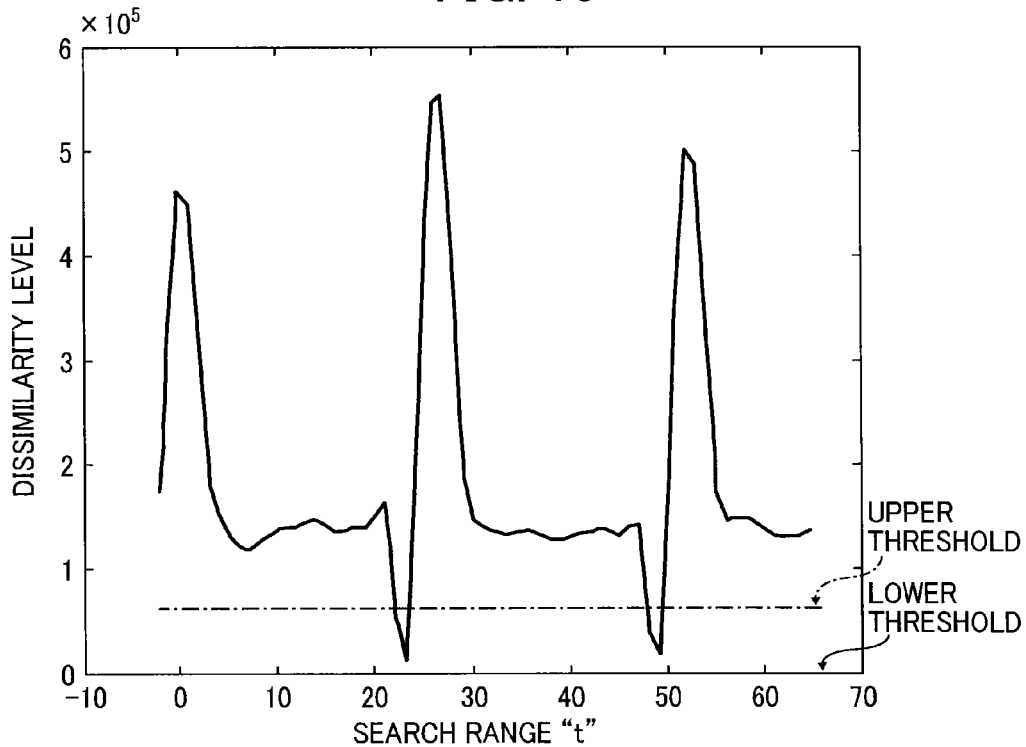
FIG. 15 is a second example of computing result of the disparity calculator.
Figure 16:
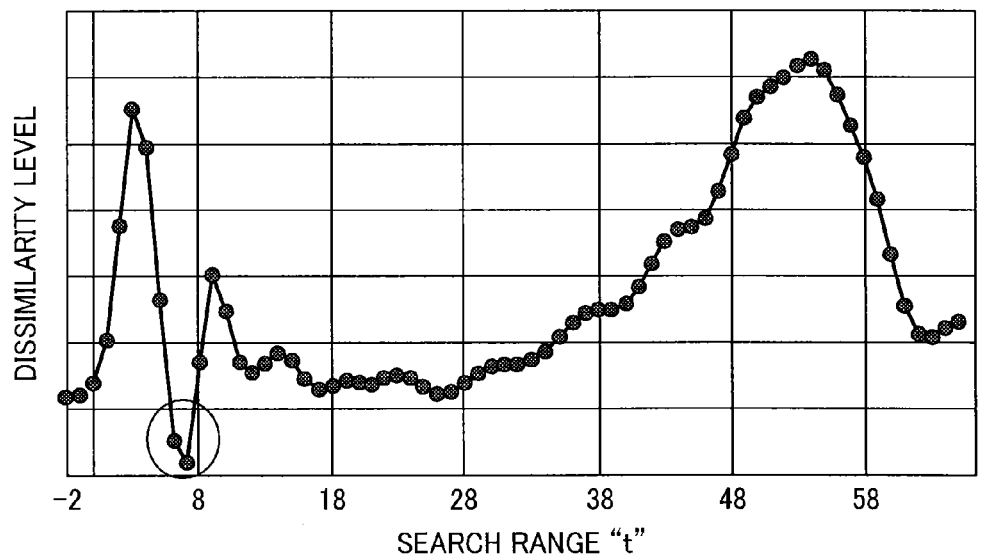
FIG. 16 is one example of a profile obtained by a matching process.
Figure 17:
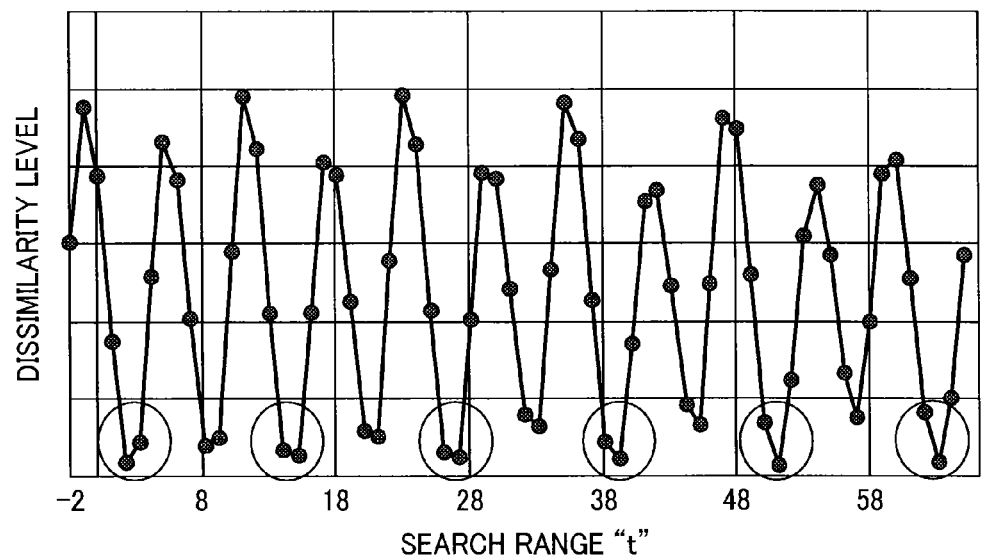
FIG. 17 is another example of a profile obtained by a matching process.

FIG. 14 is a first example of computing result of the disparity calculator 32, and FIG. 15 is a second example of computing result of the disparity calculator 32. In cases of FIGS. 14 and 15, the horizontal axis represents the search range, and the vertical axis represents the dissimilarity level such as ZSSD calculated by using a block of 7 pixels×7 pixels. The negative part of the search range is used to obtain a sub-pixel disparity.

FIG. 14 is a profile of calculated disparity of an image of windows of a building, in which the upper threshold "Uth" and the lower threshold "Lth" are updated finally (or most recently). Specifically, the upper threshold "Uth" and the lower threshold "Lth" are set to the local minimum detected at the eighth pixel in the search range. In this case, the number of points corresponding to the local minimum existing within the threshold range is "4," and the effectiveness determination unit 47 determines that the disparity calculation is null.

FIG. 15 is a profile of calculated disparity of an image of a tiled wall, in which the upper threshold "Uth" and the lower threshold "Lth" are updated finally (or most recently). Specifically, the upper threshold "Uth" and the lower threshold "Lth" are set to the local minimum detected at the 23th pixel in the search range. In this case, the number of points corresponding to the local minimum existing within the threshold range is "2," and the effectiveness determination unit 47 determines that the disparity calculation is null.

As to the above described one or more example embodiments, even if stereo images of an object have a repetitive pattern is captured, the effectiveness of the matching process that calculates the disparity between the reference image and the comparison image of the stereo images can be determined by reducing the processing time required to determine the effectiveness of the matching process.

The present invention can be implemented in any convenient form, for example using dedicated hardware platform, or a mixture of dedicated hardware platform and software. Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions. For example, in some embodiments, any one of the information processing apparatus may include a plurality of computing devices, e.g., a server cluster, that are configured to communicate with each other over any type of communication links, including a network, a shared memory, etc. to collectively perform the processes disclosed herein.

The computer software can be provided to the programmable device using any carrier medium or storage medium such as non-volatile memory for storing processor-readable code such as a floppy disk, a flexible disk, a compact disk read only memory (CD-ROM), a compact disk rewritable (CD-RW), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a flash memory, Blu-ray disc (registered trademark), secure digital (SD) card, a solid state memory device or the like, but not limited these. Further, the computer software can be provided through communication lines such as electrical communication line. Further, the computer software can be provided in a read only memory (ROM) disposed for the computer. The computer software stored in the storage medium can be installed to the computer and executed to implement the above described processing. The computer software stored in the storage medium of an external apparatus can be downloaded and installed to the computer via a network to implement the above described processing.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by subject-oriented programming languages such as C, C++, C#, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An information processing apparatus for processing stereo images of an object captured from a plurality of viewpoints to recognize the object, the information processing apparatus comprising:
   processing circuitry to calculate a disparity of the stereo images by using a matching process, the processing circuitry being configured to:
      calculate a correlation evaluation value in a search range set for the stereo images;
      detect an extreme value of the calculated correlation evaluation value;
      set a threshold range for the detected extreme value;
      count a number of the extreme value existing within the threshold range; and
      update the set threshold range to a new threshold range when a new extreme value indicating a higher correlation level of the disparity compared to the set threshold range is detected,
   wherein the processing circuitry is configured to count the number of the extreme value in the new threshold range updated most recently in the search range.

2. The information processing apparatus of claim 1, wherein the correlation evaluation value indicates a dissimilarity level, and the extreme value is a local minimum of the correlation evaluation value.

3. The information processing apparatus of claim 1, wherein the processing circuitry is further configured to update the set threshold range to the new threshold range by setting the new extreme value having the higher correlation level of the disparity at the center of the new threshold range.

4. The information processing apparatus of claim 1, wherein the processing circuitry is further configured to determine a null of a disparity corresponding to an extreme value existing within the most recently updated threshold range when a counting number becomes a given value or more.

5. The information processing apparatus of claim 1, when a correlation evaluation value indicating a higher correlation level of the disparity compared to the most recently updated threshold range is detected, the processing circuitry is configured to output a disparity corresponding to the correlation evaluation value indicating the higher correlation level of the disparity.

6. The information processing apparatus of claim 5, wherein the processing circuitry is further configured to reset the number.

7. An image capturing apparatus, comprising:
   an image capturing sensor to capture an image of an object from a plurality of viewpoints to acquire stereo images of the object; and
   an information processing apparatus to process the stereo images to recognize the object, the information processing apparatus comprising:
   processing circuitry to calculate a disparity of the stereo images by using a matching process, the disparity calculator comprising processing circuitry being configured to:
      calculate a correlation evaluation value in a search range set for the stereo images;
      detect an extreme value of the calculated correlation evaluation value;
      set a threshold range for the detected extreme value;
      count a number of the extreme value existing within the threshold range; and
      update the set threshold range to a new threshold range when a new extreme value indicating a higher correlation level of the disparity compared to the set threshold range is detected,
   wherein the processing circuitry is configured to count the number of the extreme value in the new threshold range most recently updated in the search range.

8. A control system applicable to a moveable apparatus, comprising:
   an image capture sensor mountable on the moveable apparatus to capture stereo images of an object from a plurality of viewpoints;
   the information processing apparatus of claim 1 to process the stereo images to recognize the object; and
   a control circuit to control the moveable apparatus based on a recognition result of the information processing apparatus.

9. A method of recognizing an object by capturing stereo images of the object from a plurality of viewpoints and calculating a disparity of the stereo images by using a matching process, the method comprising;
   calculating a correlation evaluation value in a search range set for the stereo images;
   detecting an extreme value of the calculated correlation evaluation value;
   setting a threshold range for the detected extreme value;
   counting a number of extreme value existing within the set threshold range; and
   updating the set threshold range to a new threshold range when an extreme value having a higher correlation level of the disparity compared to the set threshold range is detected at the detecting step; and
   counting the number of extreme value in the new threshold range updated most recently in the search range.

10. A non-transitory storage medium storing a program that, when executed by a computer, causes the computer to execute the method of claim 9.

* * * * *